(12) United States Patent
Sunderrajan

(10) Patent No.: US 8,908,503 B2
(45) Date of Patent: Dec. 9, 2014

(54) METHOD AND APPARATUS OF PERFORMING A MULTI-CHANNEL DATA TRANSMISSION

(75) Inventor: Santhoshkumar Sunderrajan, Goleta, CA (US)

(73) Assignee: Kaseya Limited (IE)

( * ) Notice: Subject to any disclaimer, the term of this patent is extended or adjusted under 35 U.S.C. 154(b) by 258 days.

(21) Appl. No.: 13/310,874

(22) Filed: Dec. 5, 2011

(65) Prior Publication Data

US 2013/0142035 A1 Jun. 6, 2013

(51) Int. Cl.
- *H04L 1/00* (2006.01)
- *H04W 4/00* (2009.01)
- *H04L 12/66* (2006.01)
- *H04L 12/28* (2006.01)
- *G06F 15/173* (2006.01)
- *H04B 17/00* (2006.01)

(52) U.S. Cl.
USPC .......... 370/225; 370/252; 370/329; 370/352; 370/392; 709/224; 455/67.13

(58) Field of Classification Search
USPC .............. 370/252, 329, 352, 392; 455/67.13; 710/38; 709/224
See application file for complete search history.

(56) References Cited

U.S. PATENT DOCUMENTS

| | | | |
|---|---|---|---|
| 7,822,889 B2* | 10/2010 | Arimilli et al. | 710/38 |
| 2006/0094371 A1* | 5/2006 | Nguyen | 455/67.13 |
| 2010/0150157 A1* | 6/2010 | Wang et al. | 370/392 |
| 2011/0087775 A1* | 4/2011 | Lee et al. | 709/224 |
| 2011/0206041 A1* | 8/2011 | Schindler et al. | 370/352 |
| 2012/0033632 A1* | 2/2012 | Kawamura et al. | 370/329 |
| 2012/0039200 A1* | 2/2012 | Lee et al. | 370/252 |

* cited by examiner

*Primary Examiner* — Jung Park
*Assistant Examiner* — Chuong M Nguyen

(57) ABSTRACT

Disclosed are an apparatus and method of performing a data channel change-over procedure. One example method of operation may include detecting an abnormality in an active data communication channel established between at least two endpoint devices. The method may further provide selecting a next available data communication channel based on at least one data channel metric and transmitting at least one change-over message via an active control channel established between the at least two endpoints. The method may further include transmitting subsequent data messages over the next available data communication channel.

14 Claims, 5 Drawing Sheets

METHOD AND APPARATUS OF PERFORMING A MULTI-CHANNEL DATA TRANSMISSION

TECHNICAL FIELD OF THE INVENTION

This invention relates to a method and apparatus of performing multi-channel data transmission, and more particularly to optimizing connection channel use when performing multi-channel data transmission functionality.

BACKGROUND OF THE INVENTION

Communication sessions may be established between two or more devices operating in a data networking environment. In certain instances those communication sessions may be setup between third party network elements which perform relay functions for the corresponding network devices. Multi-channel data transmission functions are based on more than one type of channel. For example, a control channel and a data channel may be used concurrently to perform a relay function. Current data transmission performed in data networks may be susceptible to connection loss, such as unexpected connection drops and lost communication sessions. This invention presents a method that uses multi-channel data transmission to provide fault tolerance in case of a connection failure.

SUMMARY OF THE INVENTION

An example embodiment of the present invention may include a method of performing a data channel change-over procedure. The method may include detecting an abnormality in an active data communication channel established between at least two endpoint devices. The method may also include selecting a next available data communication channel based on at least one data channel metric, transmitting at least one change-over message via an active control channel established between the at least two endpoints, and transmitting subsequent data messages over the next available data communication channel.

Another example embodiment of the present invention may include an apparatus configured to perform a data channel change-over procedure. The apparatus may include a processor configured to detect an abnormality in an active data communication channel established between at least two endpoint devices, and select a next available data communication channel based on at least one data channel metric. The apparatus may also include a transmitter configured to transmit at least one change-over message via an active control channel established between the at least two endpoints, and transmit subsequent data messages over the next available data communication channel.

DETAILED DESCRIPTION OF THE INVENTION

Figure 1:
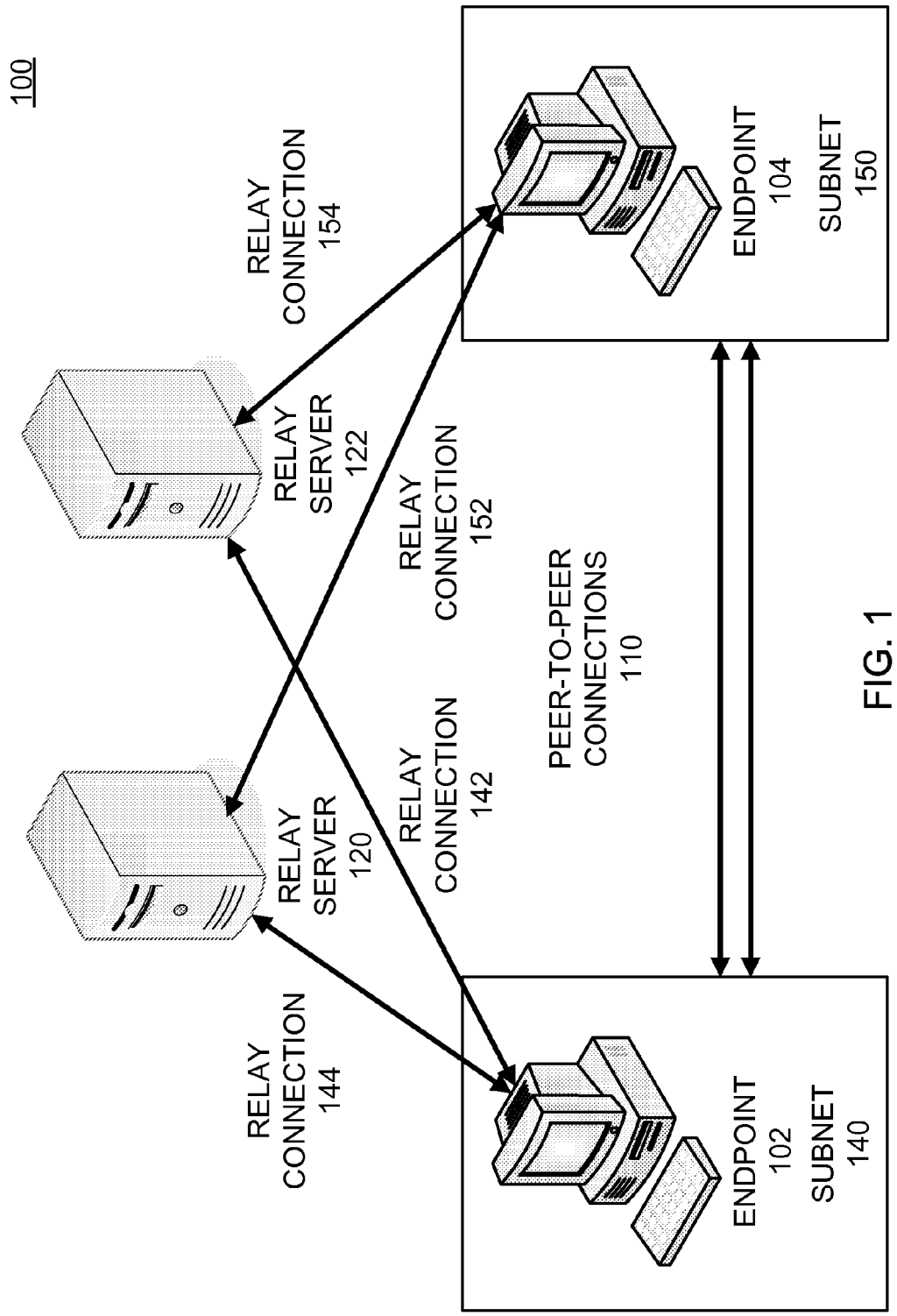
FIG. 1 illustrates an example prior art configuration with all the data being transferred through a single channel with zero fault tolerance according to example embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

The term 'admin' may refer to a client side of the communication process. 'Agent' may refer to a server side of the communication process. A 'control channel' is a channel through which connection initiations, terminations, and change-overs are performed. A 'data channel' is a channel through which the actual client side data flows. A 'peer-to-peer communication session' is a direct connection between two endpoints without an intermediate relay server. TCP is a transmission control protocol used to establish a communication session. Change-over is a procedure used to change-over from one data stream to another data stream and/or one connection to another connection for sending/receiving data.

Example embodiments of the present invention may provide optimized stability of a data communication channel setup and corresponding procedure. Multi-channel relay generally uses two or more channels. In a two-channel approach, the first channel may be a control channel, and the second channel may be a data channel. The application data would be transferred from one network device to another network device through a separate data channel based on the availability of such a channel. A control channel may be used to setup and maintain connection initiations, terminations, changeovers, etc.

FIG. 1 illustrates a conventional communication session 100. Referring to FIG. 1, there are a number of channels established between the two endpoint devices 102 and 104. For example, a first relay connection including channels 144 and 154, a second relay connection including channels 142 and 152, and/or a combination of peer-to-peer channels 110. All the connection messages and application messages are routed through the same channel. For example, a relay connection including channels 144 and 154 channels would transfer both connection and application messages. In the event of a failure of a selected channel (144 and 154), no data can be transferred through other available channels since the control channels 144 and 154 are down. Because of the absence of a "standalone" control channel, the session cannot synchronize after the last failure and proceed with communications from where it left off prior to the failure.

Figure 2:
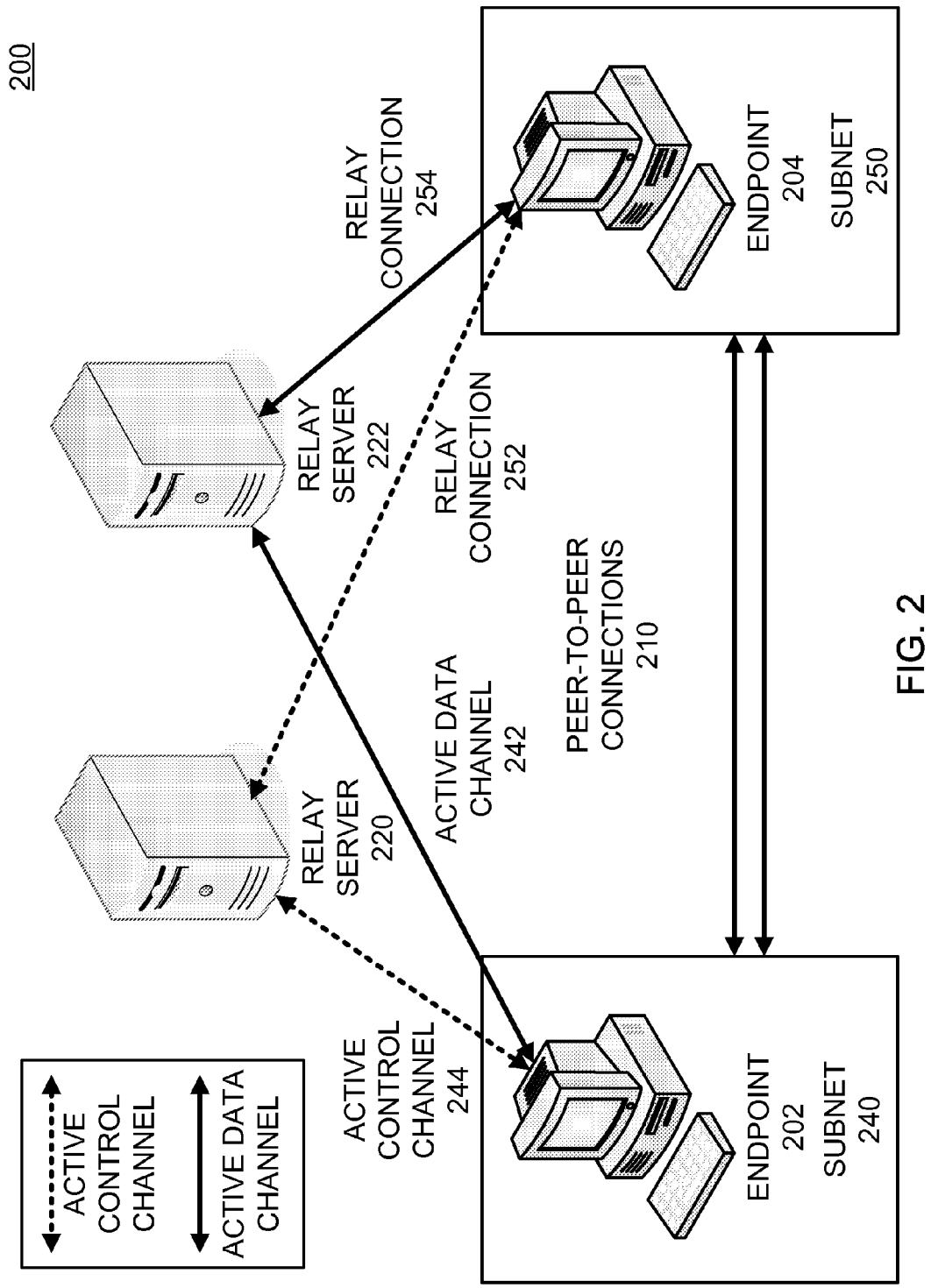
FIG. 2 illustrates an example peer-to-peer communication session including third party relay servers according to example embodiments of the present invention.

FIG. 2 illustrates an example multi-channel data transmission configuration according to example embodiments. Referring to FIG. 2, the peer-to-peer relay configuration 200 may include peer-to-peer connections 210 that are established between two or more network entities communicating over the Internet, a local area network (LAN), a wireless network, a wired-line network, etc. In this particular configuration, relay servers 220 and 222 may provide data channel and/or control channel redundancy for the peer-to-peer communication session. The control channel 210 may be setup first as a virtual connection between two endpoints 202 and 204 operating on two separate sub-networks 240 and 250, respectively, which is preferably a relay connection due to its stability, availability and network compatibility. The active data channel 242 and the active control channel 244 may be selected based on their throughput, latency and other network-based considerations and factors (e.g., fastest path, most reliable path, most available path, etc.).

Relay connections 252 and 254 may require maintenance messaging, ongoing communication messaging, checkup procedures, etc., in order to maintain and establish an active communication sessions. A robust relay system would be tolerant to abnormal activity, such as connection failures, increases and/or decreases in latency, error messages, etc. During abnormal data channel failures, a data channel change-over mechanism may be performed through the active control channel 244 to initiate and/or execute a change-over procedure to another data channel (i.e., new data channel, alternate data channel, concurrent data channel, etc.). A client side (admin) may be used to decide the next best available data channel based on throughput and latency measurements and auditing procedures. The client side may initiate a change-over process by transferring messages through the active control channel 244.

Channels may cache the last few messages in a queue whenever the connection drops, the new data channel would start from where the previous data channel stopped before the failure. At the start of a session, the connection between the ADMIN and the AGENT sides are made through the relay servers 220 and 222. This connection would be used as both control and data channels. Multiple connections may be obtained through other relay servers, parallel TCP based peer-to-peer connections, and UDP hole punching based peer-to-peer connections.

The best data channel having a highest throughput and low latency should be selected based on one or more bandwidth tests performed over the channel. A change-over process would be initiated through the control channel to change-over to the best available data channel. After a successful negotiation, the data is transferred through the best available data channel. Each channel would cache the last few messages that it sent on a particular queue. By caching the last few messages whenever the active or current data channel fails, the change-over data channel could resume service from where the previous data channel stopped.

A change-over message may contain a sequence number of the last received message from either of the two endpoints 102 and 104, the new data channel would begin sending messages from the sequence number that it received through the change-over message. In case of a failure of the control channel 112, the next available relay connection is selected as the control channel. If no relay connection is available, a non-active data channel would be selected as the next control channel. If no non-active data channel is available, the active data channel would be designated as both the control and data channels. Thereafter, the next available channel would become the next control channel. A data channel may be selected on the basis of one or more channel metrics (e.g., channel bandwidth capacity, channel data throughput (Mbps), channel latency (delays), channel availability (downtime vs. uptime)).

The current session may refresh and/or be restarted in the case of no more connections being available to change-over after a failure. The control channel 112 may be setup first. A relay connection may be used for a control channel due to its stability and security. The control messages may be relatively short as compared to data messages. Fixing the control channel provides the flexibility to select the best data channel for subsequent data transfers. If the best channel is selected as both a control and data channel, then a change-over mechanism may not be performed during a connection failure. The granularity of a message queue mechanism for resending data would be performed at application level messages and not at the TCP packets. It would complicate the system to implement a retransmission protocol at the TCP packets level. After a changeover, the failed data channel can attempt to reconnect in the background. The multi-channel communication session would work with little delay (due to the change-over) as compared to a reconnect-based solution which might or might not succeed in reconnecting at all. Obviously, reconnection based solutions would incur a large delay once a failure takes place. As a result, the reconnection-based solution creates a lot of overhead.

Figure 3:
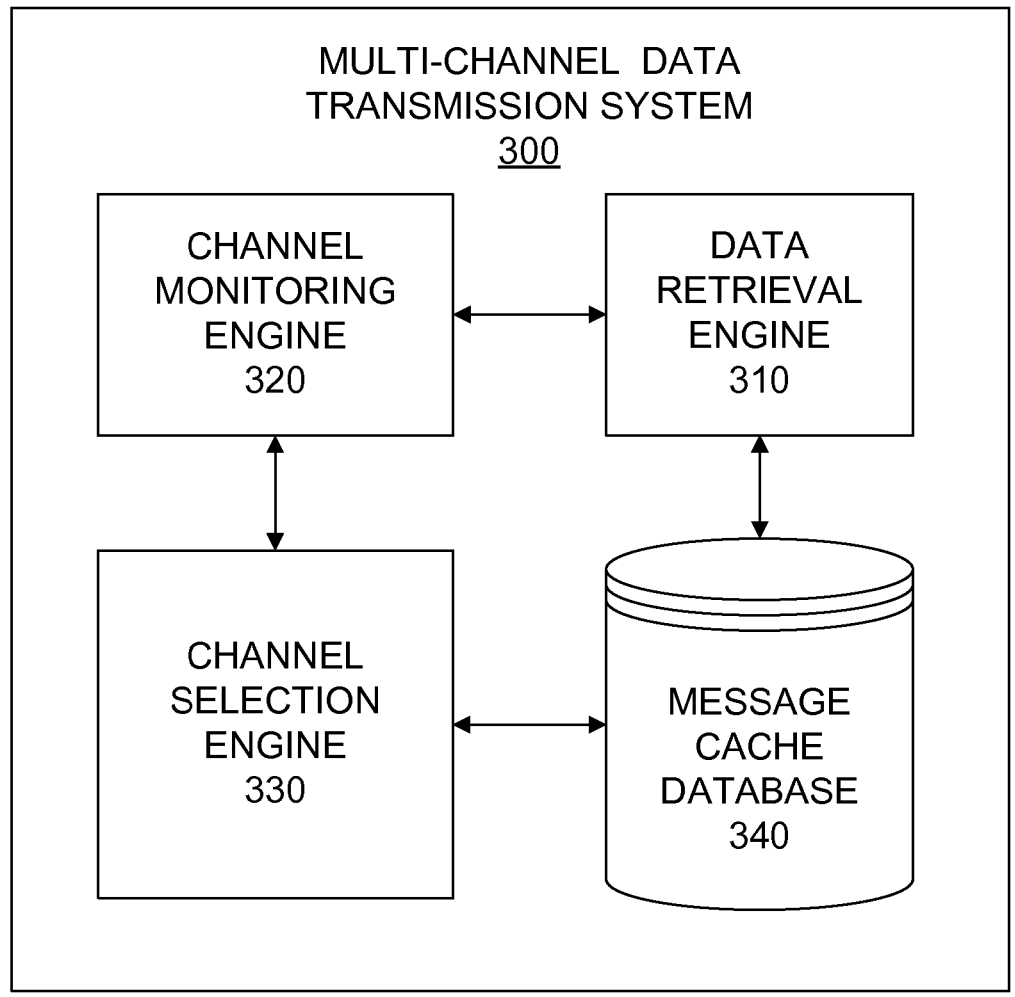
FIG. 3 illustrates a multi-channel data transmission configuration according to example embodiments of the present invention.

FIG. 3 illustrates an example multi-channel data transmission system 300 according to example embodiments. Referring to FIG. 3, the relay system 300 may perform a data channel change-over procedure from an active data communication channel to a new data communication channel. The data transmission system 300 may detect an abnormality in an active data communication channel established between at least two endpoint devices via a channel monitoring engine 320. A channel selection engine 330 may be used to select a next available data communication channel based on at least one data channel metric including any one or more of a channel bandwidth capacity, a channel data throughput, a channel latency, and a channel availability. The relay system 300 may then transmit a change-over message via an active control channel established between the endpoints and transmit subsequent data messages over the next available data communication channel.

According to one example, the active control channel may be the same as the active data channel, or instead the active control channel may be different from the active data channel. The active control channel and the active data communication channel are relay connections that connect to a relay server located between the at least two endpoint devices. The relay system 300 may establish an initial connection between the two endpoint devices, the initial connection may be used to communicate control messages and data messages prior to establishing the initial data communication channel and the active control channel. The relay system 300 may cache a number of recently transmitted messages transmitted through the initial data communication channel and/or the active control channel in a message cache database 340. In the event that the new channel is selected, the data retrieval engine 310 may retrieve the recently transmitted messages from the cache prior to transmitting subsequent data messages over the next available data communication channel to determine a point where the previously active data communication channel stopped transmitting data messages.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 4 illustrates an example network element 400, which may represent any of the above-described network components of FIGS. 1-3.

Figure 4:
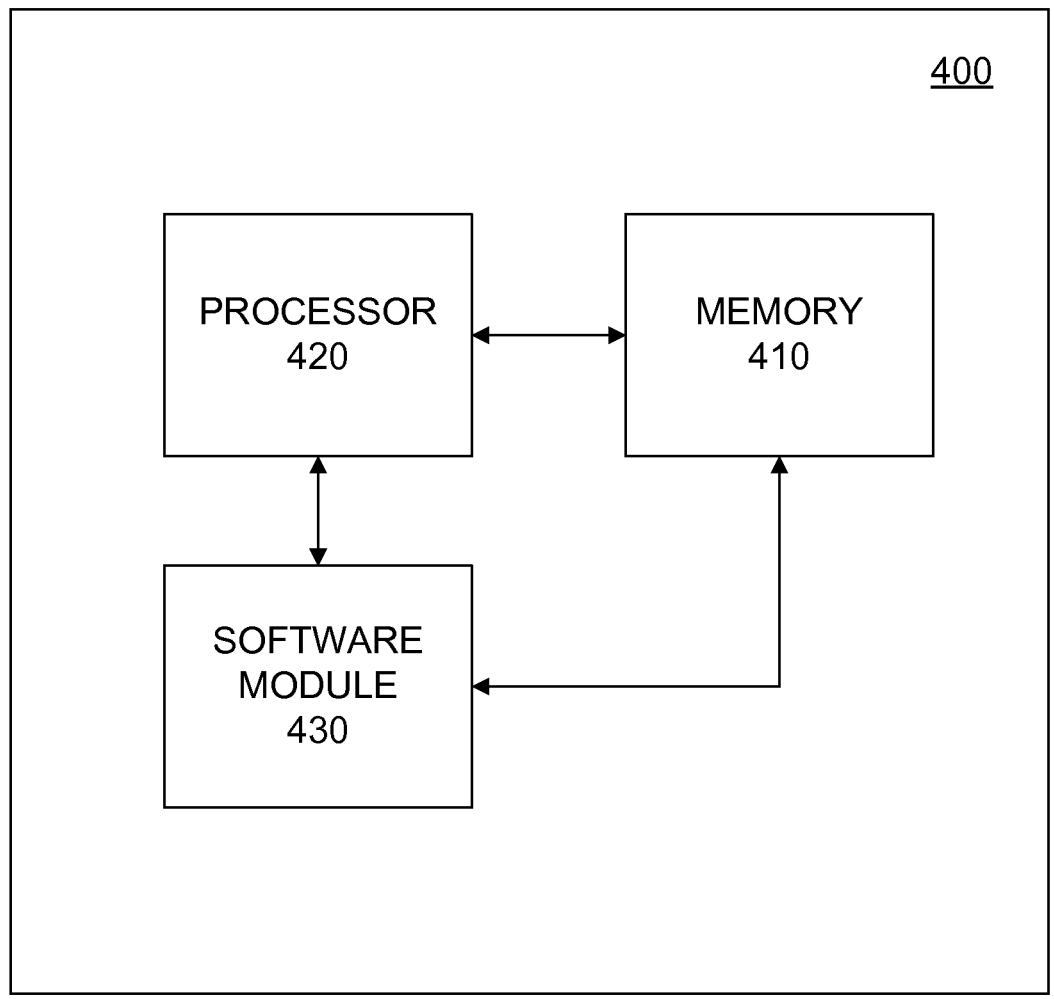
FIG. 4 illustrates an example network entity device configured to store instructions, software, and corresponding hardware for executing the same, according to example embodiments of the present invention.

As illustrated in FIG. 4, a memory 410 and a processor 420 may be discrete components of the network entity 400 that are used to execute an application or set of operations. The application may be coded in software in a computer language understood by the processor 420, and stored in a computer readable medium, such as, the memory 410. The computer readable medium may be a non-transitory computer readable medium that includes tangible hardware components in addition to software stored in memory. Furthermore, a software module 430 may be another discrete entity that is part of the network entity 400, and which contains software instructions that may be executed by the processor 420. In addition to the above noted components of the network entity 400, the network entity 400 may also have a transmitter and receiver pair configured to receive and transmit communication signals (not shown).

Figure 5:
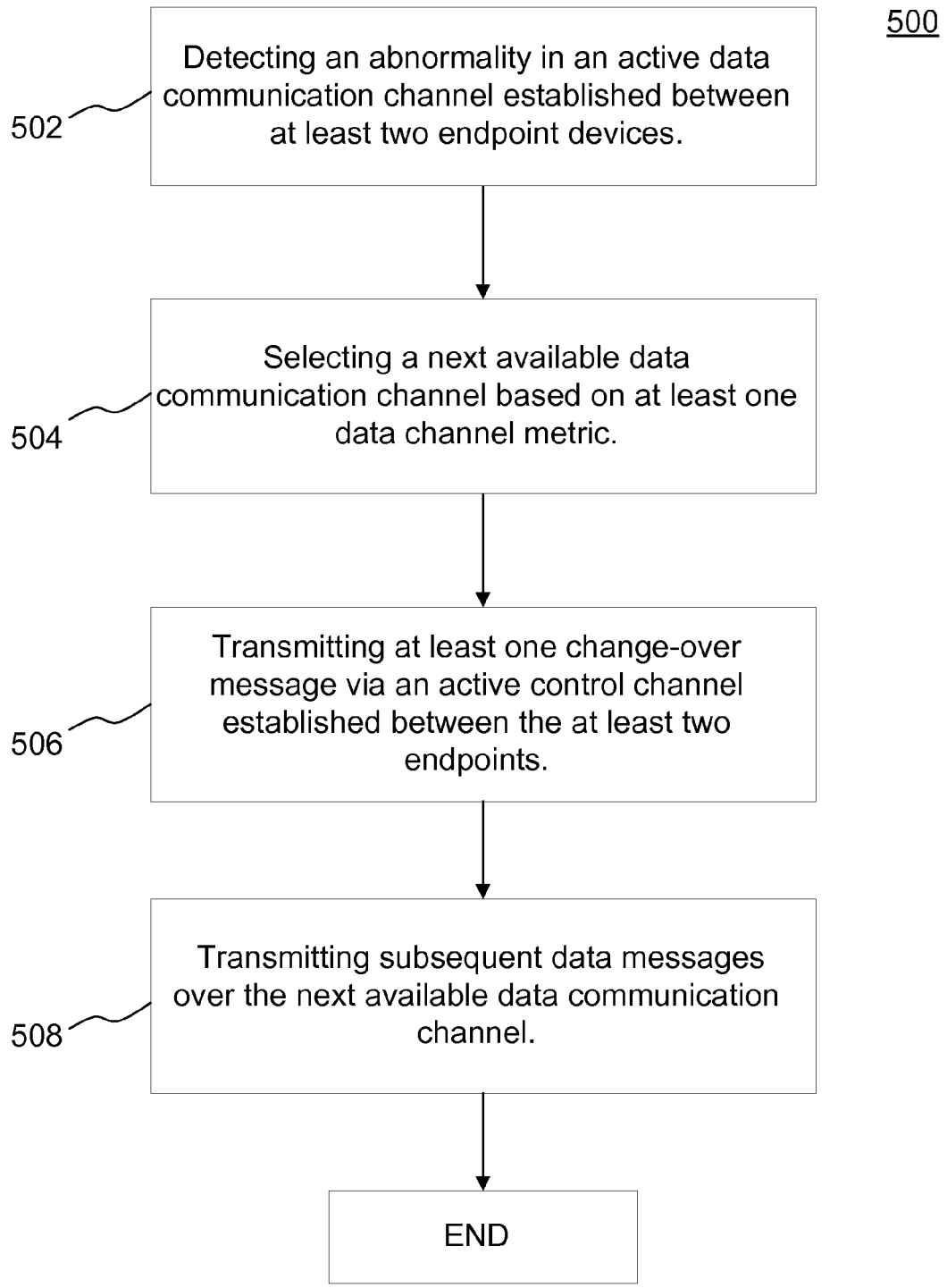
FIG. 5 illustrates an example method flow diagram, according to example embodiments of the present invention.

FIG. 5 illustrates one example method of operation according to example embodiments of the present invention which may include a method 500 of performing a data channel change-over procedure. The method may include detecting an abnormality in an active data communication channel established between at least two endpoint devices at operation 502 and selecting a next available data communication channel based on at least one data channel metric at operation 504. The method may also include transmitting at least one change-over message via an active control channel established between the at least two endpoints at operation 506 and transmitting subsequent data messages over the next available data communication channel at operation 508.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method of performing a data channel change-over procedure, the method comprising:
   detecting an abnormality in an active data communication channel established between at least two endpoint devices, wherein the active data communication channel is being used to transfer data packets between the at least two endpoints, and wherein the abnormality is a disruption in the data packet transfer;
   selecting a next available data communication channel based on at least one data channel metric;
   transmitting at least one change-over message via an active control channel established between the at least two endpoints that is different channel from the active data communication channel, and wherein the active control channel and the active data channel are relay type channel connections; and
   transmitting subsequent data messages over the next available data communication channel.

2. The method of claim 1, wherein the at least one data channel metric comprises at least one of channel bandwidth capacity, channel data throughput, channel latency, and channel availability.

3. The method of claim 1, wherein the active control channel and the active data communication channel connect to a relay server located between the at least two endpoint devices.

4. The method of claim 1, further comprising:
   establishing an initial connection between the at least two endpoint devices, the initial connection used to communicate control messages and data messages prior to establishing the initial data communication channel and the active control channel.

5. The method of claim 1, further comprising:
   caching a plurality of recently transmitted messages transmitted through the initial data communication channel and the active control channel in a cache; and
   retrieving the plurality of recently transmitted messages from the cache prior to transmitting subsequent data messages over the next available data communication channel to determine a point where the previously active data communication channel stopped transmitting data messages.

6. An apparatus configured to perform a data channel change-over procedure, the apparatus comprising:
   a processor configured to
      detect an abnormality in an active data communication channel established between at least two endpoint devices, wherein the active data communication channel is being used to transfer data packets between the at least two endpoints, and wherein the abnormality is a disruption in the data packet transfer,
      select a next available data communication channel based on at least one data channel metric; and
   a transmitter configured to transmit at least one change-over message via an active control channel established between the at least two endpoints that is a different channel from the active data communication channel, wherein the active control channel and the active data channel are relay type channel connections, and wherein the transmitter is further configured to transmit subsequent data messages over the next available data communication channel.

7. The apparatus of claim 6, wherein the at least one data channel metric comprises at least one of channel bandwidth capacity, channel data throughput, channel latency, and channel availability.

8. The apparatus of claim 6, wherein the active control channel and the active data communication channel connect to a relay server located between the at least two endpoint devices.

9. The apparatus of claim 6, wherein the processor is further configured to establish an initial connection between the at least two endpoint devices, the initial connection used to communicate control messages and data messages prior to establishing the initial data communication channel and the active control channel.

10. The apparatus of claim 6, further comprising:
a memory configured to store a plurality of recently transmitted messages transmitted through the initial data communication channel and the active control channel, and wherein the processor is further configured to retrieve the plurality of recently transmitted messages from the cache prior to transmitting subsequent data messages over the next available data communication channel to determine a point where the previously active data communication channel stopped transmitting data messages.

11. A non-transitory computer readable storage medium configured to store instructions that when executed cause a processor to perform a data channel change-over procedure, the processor being further configured to perform:
detecting an abnormality in an active data communication channel established between at least two endpoint devices, wherein the active data communication channel is being used to transfer data packets between the at least two endpoints, and wherein the abnormality is a disruption in the data packet transfer;
selecting a next available data communication channel based on at least one data channel metric;
transmitting at least one change-over message via an active control channel established between the at least two endpoints that is a different channel from the active data communication channel, and wherein the active control channel and the active data channel are relay type channel connections; and
transmitting subsequent data messages over the next available data communication channel.

12. The non-transitory computer readable storage medium of claim 11, wherein the at least one data channel metric comprises at least one of channel bandwidth capacity, channel data throughput, channel latency, and channel availability.

13. The non-transitory computer readable storage medium of claim 11, wherein the active control channel and the active data communication channel connect to a relay server located between the at least two endpoint devices.

14. The non-transitory computer readable storage medium of claim 11, wherein the processor is further configured to perform:
establishing an initial connection between the at least two endpoint devices, the initial connection used to communicate control messages and data messages prior to establishing the initial data communication channel and the active control channel;
caching a plurality of recently transmitted messages transmitted through the initial data communication channel and the active control channel in a cache; and
retrieving the plurality of recently transmitted messages from the cache prior to transmitting subsequent data messages over the next available data communication channel to determine a point where the previously active data communication channel stopped transmitting data messages.

* * * * *